(12) United States Patent
Shaw

(10) Patent No.: US 8,346,602 B2
(45) Date of Patent: Jan. 1, 2013

(54) METHOD OF PROVIDING AND TRACKING EMBEDDED E-MAIL ADVERTISING

(76) Inventor: Mark D. Shaw, Ponte Vedra Beach, FL (US)

( * ) Notice: Subject to any disclaimer, the term of this patent is extended or adjusted under 35 U.S.C. 154(b) by 1226 days.

(21) Appl. No.: 09/862,065

(22) Filed: May 21, 2001

(65) Prior Publication Data

US 2001/0044745 A1    Nov. 22, 2001

Related U.S. Application Data

(60) Provisional application No. 60/206,559, filed on May 22, 2000.

(51) Int. Cl.
  *G06Q 30/00*    (2012.01)

(52) U.S. Cl. ............... 705/14.16; 705/14.49; 705/14.66

(58) Field of Classification Search .............. 705/14, 705/26, 14.16, 14.49, 14.66
  See application file for complete search history.

(56) References Cited

U.S. PATENT DOCUMENTS

| 6,205,432 B1 * | 3/2001 | Gabbard et al. ............... 705/14 |
| 6,615,183 B1 * | 9/2003 | Kolls ............................. 705/26 |
| 2001/0047294 A1 * | 11/2001 | Rothschild ...................... 705/14 |

* cited by examiner

*Primary Examiner* — Raquel Alvarez
(74) *Attorney, Agent, or Firm* — Thomas C. Saitta

(57) ABSTRACT

A business model and method for providing and tracking embedded e-mail advertising, where the e-mail sender is compensated in an amount based on the volume of e-mail transmitted which contains embedded advertising.

6 Claims, 1 Drawing Sheet

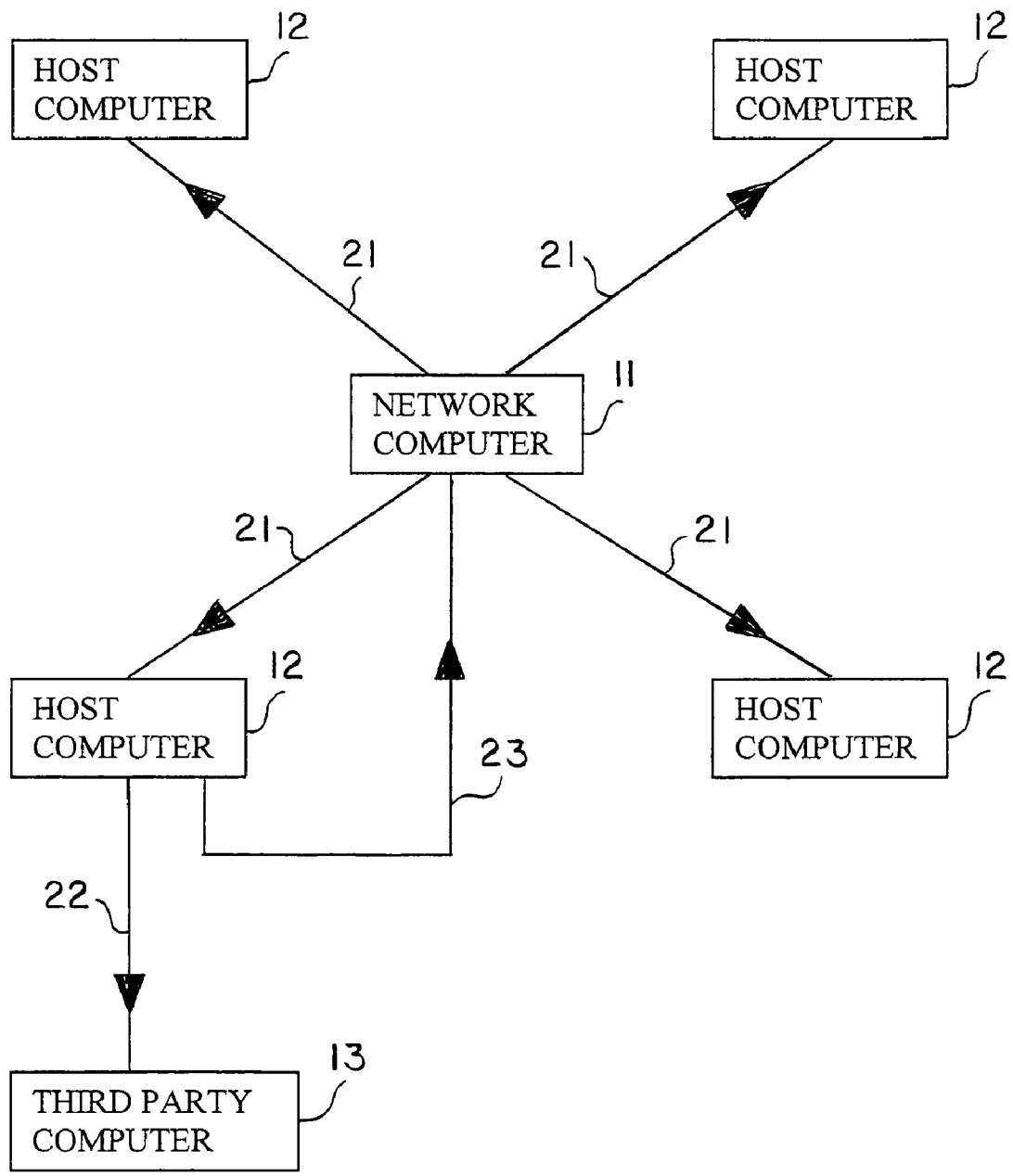

METHOD OF PROVIDING AND TRACKING EMBEDDED E-MAIL ADVERTISING

This application claims the benefit of U.S. Provisional Application Ser. No. 60/206,559, filed May 22, 2000.

BACKGROUND OF THE INVENTION

This invention relates to business model methods involving a global computer network allowing electronic mail (e-mail) communication between users and software for providing advertising content on e-mail communications and for tracking e-mail activity.

It is well known in modern advertising to present advertising content to potential consumers in contexts which were considered to be overly intrusive and off-limits only a short time ago. Manufacturers took the first step by conspicuously branding their finished products with external labels and the like, so that a constant reminder of the source of the goods would be presented. Clothing designers began using their trademarks as an external design element. Baseball caps and T-shirts bearing advertising messages are now ubiquitous. Television broadcast stations and networks have moved from identifying themselves during commercial breaks to continuously superimposing their logo into a corner of the screen. Sporting events and stadiums bear corporate names. In the world of the Internet, individual web sites contain banner ads for other products and services. Software allows a banner ad on one web site to be a direct portal to the advertiser's own site by a simple click of the mouse. Thus, the consuming public is no longer sufficiently bothered by the presence of advertising copy for it to be received in a negative light in almost any imaginable context.

One of the major uses for the Internet is for the transmission of communications from one user to another user, which is commonly known as electronic mail or e-mail. Each user has an unique e-mail address, allowing the correspondence to be sent directly to the recipient. Millions of e-mail messages are sent and received each day, and e-mail is now as commonplace a method of exchanging information as the telephone, telefax or the postal system.

This incredibly large amount of Internet e-mail traffic is not currently being utilized as an advertising vehicle. It is an object of this invention to provide a business model and methodology for embedding advertising into individual e-mail communications, where the e-mail sender is compensated for transmitting e-mail containing the advertising. It is a further object to provide software programming which monitors the e-mail traffic in order to properly credit and compensate the e-mail sender. It is a further object to have the embedded advertising structured to allow the e-mail recipient to connect directly with the advertiser's web site by a single mouse click, as well as to join in the compensated advertising program. It is a further object to provide software which is capable of detecting fraudulent or mass e-mailings sent merely for the purpose of receiving compensation. These and other objects not expressly stated are to be accomplished as disclosed below.

SUMMARY OF THE INVENTION

The invention is a business model and method for providing and tracking advertising embedded in e-mail by a host e-mail account to a third party computer 13, where the e-mail sender is compensated in an amount based on the volume of e-mail transmitted which contains embedded advertising. An advertiser, a marketing company or service provider in association with multiple advertisers, enlists individual e-mail users as hosts, where through Internet routing, software provided to the host, or other methods, every e-mail transmitted by a host account to a third party includes an embedded or attached advertising message, such as a banner ad. The ads may be static or change with each e-mail transmission, with the ads being downloaded into the host's hard drive or relayed from the advertiser's computer with each transmission. Notice of the transmission event is relayed over the Internet to the advertiser's computer, as well as other data which identifies the sender, acknowledges receipt of the e-mail by the recipient, tabulates the number of e-mails in a given period, etc. The data is processed by the advertiser's computer and the host is properly credited. Means may also be provided to develop account profiles, monitor for unscrupulous hosts attempting to mass distribute e-mail to build volume, etc. Means may also be embedded into the transmitted e-mail to allow the recipient to join the advertising program.

BRIEF DESCRIPTION OF THE DRAWINGS

FIG. 1 is a schematic illustration of the method.

DETAILED DESCRIPTION OF THE INVENTION

Custom developed software and Internet communications are utilized in the provision of a business model and method for embedding advertising copy into individual e-mail transmissions sent by host accounts which are members of the compensation network. Technology which allows for the tracking of third party e-mail transmissions is critical to the success of the business model and method.

An advertising entity, which herein encompasses an entity having computer processing capability in communication with a global computer network, i.e., the Internet, is the hub of a large membership organization comprised of individual e-mail users having personal e-mail accounts, known herein as hosts or host e-mail accounts. An advertising entity, as the term is used herein, may comprise a direct source of goods or services, a marketing or advertising agency representing many product or service providers, or even an Internet service provider. The advertising entity controls the software necessary to operate the system over the Internet as well as providing the advertising content which is embedded into the host e-mail transmissions. The advertising content may be exclusively related to the advertising entity itself, i.e., the content may be advertising only the goods or services of the advertising entity, or the advertising entity may act as a conduit or broker for advertising content from multiple sources. Preferably the advertising entity maintains a web site which is accessible by the host accounts as well as potential hosts.

The individual hosts are recruited using various known techniques, such as traditional advertising in media and print, as well as Internet advertising. The advertising entity may also directly contact prospective hosts via e-mail. A host joins the organization network, preferably through an e-mail or web site sign-up process, on a contractual basis whereby the host agrees to allow placement of an advertisement within or accompanying any e-mail transmission made to a third party computer 13. In return, the advertising entity agrees to compensate the host for transmission of the advertising. The host's e-mail protocol and e-mail program is then accessed by the advertising entity's computer, hereinafter referred to as the network computer 11, and custom software is downloaded (shown as 21) as necessary onto the host's computer 12 to provide the basis for proper accounting communications between the host and the advertising entity.

The software serves several purposes, primarily involving the placement of the advertising message or banner ad into the host's e-mail transmission and the tracking of the transmission event data. The embedded advertising may comprise text or figures positioned within the actual message text portion of the host's e-mail, or more preferably may comprise separate windows, commonly referred to as banner ads, which would appear in the text window. Most preferably, the banner ads will allow for automatic connection by the recipient to a web site related to the banner ad. Such technology is well known, whereby a user can access a web site simply by clicking on the banner ad. The network computer 11 determines the particular ad which is embedded in the e-mail transmission. The same ad may be transmitted with every e-mail, or the ads may vary on a periodic basis or change with every transmission. In addition, profiles may be developed on either or both the host and the recipients, whereby advertising targeted to specific interests may be directed to those particular hosts and recipients by the advertising entity rather than delivering random messages.

The network computer 11 is notified (shown as 23) every time an e-mail transmission bearing an embedded ad is successfully delivered to a third party (shown as 22). The host account is then credited with the predetermined compensation amount. The software may also register other data, but will not be capable of reading the actual text messages transmitted by the host. For example, the software will tabulate the total number of e-mails sent in a given period, and a maximum number may be imposed by agreement in order to prevent abuse of the system by hosts sending multitudes of e-mails simply to build volume for compensation. Likewise, the advertising entity's software may investigate whether a host has reprogrammed any downloaded software for the purpose of registering e-mail transmissions without actually sending any. The software may also be utilized to monitor the host's browsing habits and develop profiles of interests, such that advertising of a specific nature relating to the interests to the host or the e-mail recipients could be supplied. Hosts would also preferably be able to access their accounts on the network computer 11 through the web site to obtain information on their compensation. Compensation could be handled electronically via direct deposit, or a check could be produced and mailed. Other forms of compensation in the form of credits for on-line merchants, airline miles, or other commercial arrangements and benefits could also be offered.

The network computer 11 may also be programmed to allow third party advertisers to control and alter their ad presentations over the Internet. The network computer 11 would maintain data records on the number of times particular ads were embedded and provide this data to the third party advertisers. The ad space allocation could be handled in a manner similar to broadcast commercials, but with the ability to target specific consumers, based on factors such as geography, age, etc.

Preferably the software will also embed a sign-up message describing the compensation package in each e-mail transmission in order to recruit new hosts from the e-mail recipients. Preferably, this embedded message will also utilize the automatic click technology to allow the recipient to directly access the advertising entity's web site in order to join. For a multi-level compensation model, a bonus or a small percentage of a new host's e-mail transmissions can be credited to the original host that transmitted the initial e-mail which resulted in the new host joining the network. This provides additional incentive for hosts to allow the advertising to be embedded in their e-mail transmissions.

It is understood that equivalents and substitutions for certain elements set forth above may be obvious to those practitioners skilled in the art, and therefore the true scope and definition of the invention is to be as set forth in the following claims.

I claim:

1. A method for providing and tracking embedded e-mail advertising transmitted over a global computer communications system, comprising the steps of:
   creating a subscriber network of host e-mail accounts on individual host computers in communication with a network computer of an advertising entity over a global computer communications network,
   wherein each of said host e-mail accounts transmits e-mail messages from the host computer to third parties by e-mail without passing said e-mail messages through said network computer;
   downloading embedding and tracking software to each said host computer from said network computer;
   providing advertising to said host computers from said network computer to be embedded within said e-mail messages transmitted to said third parties by said host computers, tracking said e-mail messages containing said embedded e-mail advertising, and compensating said host e-mail accounts in relation to the volume of said e-mail messages containing said embedded e-mail advertising transmitted to said third parties by said host computers.

2. The method of claim 1, further comprising the step of creating automatic links within said embedded e-mail advertising, wherein said third parties may directly connect with specific web sites related to said embedded e-mail advertising.

3. The method of claim 1, further comprising the step of developing profiles of interest for said host e-mail accounts and directly targeting said interests with said embedded e-mail advertising of a content related to those interests.

4. A method for providing and tracking embedded e-mail advertising transmitted over a global computer communications system, comprising the steps of:
   creating a subscriber network of host e-mail accounts on individual host computers in communication with a network computer of an advertising entity over a global computer communications network, wherein each of said host e-mail accounts transmits e-mail messages from the host computer to third parties by e-mail without passing said e-mail messages through said network computer;
   downloading embedding and tracking software to each said host computer from said network computer;
   providing advertising to said host computers from said network computer of said advertising entity embedding said advertising messages within e-mail transmissions from any of said host e-mail accounts to any of said third parties;
   tracking the volume of said e-mail transmissions containing embedded advertising messages from each of said host e-mail accounts;
   and compensating each of said host e-mail accounts in a manner dependent on the volume of said e-mail transmissions containing embedded advertising messages sent to said third parties.

5. The method of claim 4, further comprising the step of creating automatic links within said embedded e-mail advertising, wherein said third parties may directly connect to specific web sites related to said embedded e-mail advertising.

6. The method of claim 4, further comprising the step of developing profiles of interest for said host e-mail accounts and directly targeting said interests with said embedded e-mail advertising of a content related to those interests.

* * * * *